(12) United States Patent
Lin

(10) Patent No.: US 7,965,409 B2
(45) Date of Patent: Jun. 21, 2011

(54) METHODS AND SYSTEMS FOR RENDERING AND PRINTING REVERSE FINE FEATURES

(75) Inventor: Guo-Yau Lin, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 816 days.

(21) Appl. No.: 11/957,906

(22) Filed: Dec. 17, 2007

(65) Prior Publication Data

US 2009/0153923 A1 Jun. 18, 2009

(51) Int. Cl.
*G06F 15/00* (2006.01)
*G06K 1/00* (2006.01)
*G06K 15/02* (2006.01)
*H04N 1/60* (2006.01)

(52) U.S. Cl. .......................... 358/1.2; 358/1.9
(58) Field of Classification Search .................... 358/1.2, 358/1.1, 1.9, 1.18, 1.13, 1.14, 1.15
See application file for complete search history.

(56) References Cited

U.S. PATENT DOCUMENTS

| 6,144,461 | A | 11/2000 | Crean et al. |
| 6,167,166 | A | 12/2000 | Loce et al. |
| 6,201,551 | B1 | 3/2001 | Loce et al. |
| 6,243,499 | B1 | 6/2001 | Loce et al. |
| 6,246,419 | B1 | 6/2001 | Loce et al. |
| 6,259,821 | B1 | 7/2001 | Branciforte et al. |
| 6,278,808 | B1 * | 8/2001 | Tsai et al. ............... 382/319 |
| 6,678,414 | B1 | 1/2004 | Loce et al. |
| 6,757,449 | B1 | 6/2004 | Loce |

OTHER PUBLICATIONS

U.S. Appl. No. 11/789,051, filed Apr. 23, 2007 to Guo-Yau Lin et al.

* cited by examiner

*Primary Examiner* — Douglas Q Tran
(74) *Attorney, Agent, or Firm* — Oliff & Berridge, PLC

(57) ABSTRACT

A method and system are proposed in which a moving window based operator is applied to a page of a PDL document that has been decomposed, and the objects within the page flattened and rasterized. The window moves along the raster scan line, and processes rasterized data within the window, detecting any color-to-white or white-to-color interface (edge). The white rasterized portion is then dilated outward across the interface into the color portion, the dilated amount being based on a size of a reverse fine line and/or small text font character to be reproduced. A size of the fine line and/or small text font object is determined and if below a threshold, object dilation may be given effect. A dilation amount may increase as the object size decreases until the size reaches a lower threshold at and beyond which a maximum dilation amount may be applied.

17 Claims, 5 Drawing Sheets

METHODS AND SYSTEMS FOR RENDERING AND PRINTING REVERSE FINE FEATURES

BACKGROUND

This disclosure is directed to systems and methods for improving image quality, particularly with regard to formed images including reverse fine features.

In the process of image formation, there are unique difficulties associated with rendering and/or forming reverse features on an image output medium. Reverse features are those in which white, near-white or essentially transparent images are to be disposed on the output image receiving medium within an area including a dark or color background.

Conventional methods for enhancing image quality in produced images are directed principally at attempting to ensure that edges of such images are crisply defined. Conventional methods for attempting to ensure such crispness and/or sharpness, particularly with regard to text and line objects, tend to lead to a blending of individual opposing edges that wash out a small text font or fine line object image particularly as the size of the image is reduced.

Depending on the image formation method employed by an image forming device, and on a dot-per-inch (DPI) resolution for the formed image, an ability to render and/or print finely-defined features, particularly in reverse printing may be varyingly affected. A particular image forming methodology by which such images maybe rendered less perceptible as the width of fine lines or the size of fonts are reduced involves electrostatic and/or xerographic image formation.

In many xerographic image forming systems and/or devices, for example, fill-in artifacts that are included to enhance crispness remain perceptible when printing reverse fine features, such as fine lines or small text fonts, in white on a dark or color background. As such, these fill-in artifacts may obliterate the fine lines and/or small text fonts. These problems associated with printing reverse fine features are increasingly pronounced in circumstances when, for example, high addressability halftones are employed at the edges of adjacent background pixels, and/or when the background color contains an excessive toner amount. Bleed of the fine edge adjustments into the white fine line or small text font areas result in the reverse fine features becoming indistinct or difficult to recognize and/or read.

Such difficulties arise, as introduced briefly above, because, for text and line objects, sharpness is generally an important attribute in evaluating image quality. Image forming systems enable enhanced sharpness by various methods including modifying edge pixels of an object to employ high addressability halftone screens (or outlining cells, e.g., 600 lpi line screens), while still employing base dot screens for the non-edge pixels (e.g., 200 dpi dot screens). This method can be particularly effective in enhancing sharpness of the formed image in reverse printing lines and text characters when the involved object is white, and of normal to large size, and the background is colored. High addressability halftones are applied to the colored edge pixels that belong to the background to enhance this sharpness.

However, for small text fonts and fine lines, simple readability becomes a more important attribute than individual object or character sharpness. Technologies and image forming methods designed to enable edge pixels of an object to use high addressability screens tend to exacerbate the readability problem of fine lines and small text fonts in many cases. Among other reasons, this may be because high addressability halftone dots, which are separated by small white openings of an object, such as a fine line or small text font character, are too close to each other. The interaction of the high addressability halftone dots non-linearly amplifies image development. Halftone dots tend to fill in the intended white opening and distort the appearance of the fine line or small text font character to a point that the white object becomes unreadable in part or in its entirety.

Among conventional solutions that are intended to address this problem are methods that disable the outlining cells for reverse objects when the objects are below a certain size threshold. This approach leaves the white areas more perceptible, but the objects may become too blurry when the background is lighter. Further, this approach still suffers from the fill-in artifact when the background coloring is rendered with a greater toner pile. Additionally, this approach tends to introduce a size discontinuity when objects with sizes just above and just below the threshold value for enabling and disabling cells for reverse objects are placed next to each other.

Another method by which to attempt to solve the non-readability problem for fine lines involves globally thickening a stroke size for the thin reverse lines. This method, however, also thickens the positive or color line. Although it can be implemented as size/color dependent, this method often must be applied to the page description language (PDL) or object level, for example, before flattening and rasterizing. This method is, therefore, not very straightforward.

Increasing the size of reverse printed small text font characters at the object level may make the fonts bigger instead of just thicker. Methods for accomplishing this are also not precisely straightforward. They are often system level settings and may require restart and/or additional user interaction to implement. Ultimately too, because these methods are not straightforward, they may result in undesirable image formation within the image forming device.

SUMMARY

In view of the above-identified shortfall for rendering and printing reverse fine features in image forming devices, it may be advantageous to provide systems and methods to, for example, in an object-size dependent manner, apply image adjustment to reverse objects in order to enhance readability, perhaps at the expense of sharpness.

In various exemplary embodiments, methods and systems according to this disclosure may provide a moving window based operator in which a page of a PDL document is decomposed, and the objects within the page are flattened and rasterized. A window may move along the raster scan line, and process rasterized data within the window. Inside the moving window, any color-to-white or white-to-color interface (edge) may be detected. If there is any color-to-white or white-to-color interface, the white rasterized portion may be dilated outward across the interface into the color portion. The dilated amount may be based on a size of the reverse fine line and/or small text font.

In various exemplary embodiments, disclosed systems and methods may determine a size of a fine line and/or small text font object. If the size of the object is determined to be below an upper threshold, the dilation may be given effect, but otherwise the object may be conventionally processed. A dilation amount may increase as the object size decreases until the size reaches a lower threshold, at and beyond which a maximum dilation amount may be applied. Upper size thresholds, lower size thresholds and maximum dilation amounts for differing sizes of small text font characters and/or differing thicknesses of fine lines to be formed as reverse images on an image output medium may be stored as, for example, a specified database, or otherwise within the image forming device. Such parameters may be optimized in advance to be, for example, called upon when required without real-time user interaction. Such an implementation may simplify workflow and improve image quality without user input.

In various exemplary embodiments, a method involving modifying an image to be formed may identify an object having a size (S) within a frame area. One or more thresholds may be defined as, for example, $T_{upper}$ and $T_{lower}$ in which $T_{upper}$ is an upper threshold for the object size (S), above which the identified object may not be modified, and $T_{lower}$ is a lower threshold for the object size (S) below which the identified object may be modified by a maximum dilation amount ($D_{max}$). At any point between such thresholds, a dilation amount (D) may be calculated based on the size of the identified object. The size of the identified object may be increased by a dilation amount represented by a D number of pixels on at least one side of the object.

This dilation amount (D) may be represented overall, therefore, as follows:

if $S \geq T_{upper}$, then D=0; if $S \leq T_{lower}$, then $D=D_{max}$, and if $T_{lower} < S < T_{upper}$, then $D=D_{max}*(1-(S-T_{lower})/(T_{upper}-T_{lower}))$.

and $D_{max}$ may be limited to $D_{max} \leq (T_{upper}-T_{lower})/2$.

It should be appreciated that, in an instance where the method involves describing D has a fractional, or decimal, element, an additional pixel may be added to the identified object, and the pixel may be partially dilated by modifying a contone of the pixel. The modified contone may be calculated, for example, using a formula:

modified contone=original contone*(R−D), where R is the small integer no less than D, and represents a dilation radius indicating the width of the frame; D is the calculated dilation amount described earlier.

It should be appreciated that the thresholds, such as $T_{upper}$ and $T_{lower}$, may be represented as font sizes, or as pixel widths.

The methods and systems according to the disclosure may be implemented by processing the image to be printed along a plurality of scan lines. A sliding window may be employed to categorize a plurality of objects encountered in each scan line as either white objects or non-white objects. This categorization may be made based on contone value, where objects with a contone below a pre-set value may be defined as white and objects with a contone above the pre-set value may be defined as non-white. As each object is encountered, edges associated with white objects may be added as individual events to an event list that may be referenced to, in turn, determine how each event should be processed. Each white object may be determined to have an object size represented as (S), where (S) may be different for each object. The method may then modify at least one edge of each event based on the determined size (S).

In exemplary embodiments, modifying at least one edge of an event may include, for example, the following. First, two thresholds may be defined, $T_{upper}$ and $T_{lower}$. $T_{upper}$ may be an upper size threshold, above which the object will not be modified, and $T_{lower}$ may be a lower size threshold, below which the object is modified by a maximum dilation amount ($D_{max}$). Otherwise, for objects with a size between this threshold for each object, a dilation amount (D) may be calculated based on the size of the object. The object's edge may then be increased by D number of pixels.

These and other features and advantages of the disclosed methods and systems are described in, or apparent from, the following detailed of various exemplary embodiments.

BRIEF DESCRIPTION OF DRAWINGS

Various exemplary embodiments of disclosed methods and systems for image quality adjustment for rendering and printing reverse fine features will be described, in detail, with reference to the following drawings wherein.

DETAILED DESCRIPTION OF EMBODIMENTS

The following embodiments illustrate examples of methods and systems for adjusting image quality particularly with regard to rendering an image forming reverse fine features in image forming devices. The following description of various exemplary embodiments of the methods and systems for image quality adjustment, and specifically for automated rendering an image quality formation with respect to reverse fine images in an image processing system and/or in an image forming device, may refer to one specific type of image forming device, such as, for example, an electrostatic or xerographic image forming device, and may include discussion of various terms relating to image adjustment within such an image forming device, for the sake of clarity, and ease of depiction and/or description. It should be appreciated, however, that, although the methods and systems according to this disclosure may be applicable to such a specific application, the depictions and/or descriptions included in this disclosure are not intended to be limited to any specific application, any specific type of image forming device, or any specific image rendering system. In fact, any system and/or method for image forming that may advantageously apply the image quality adjustment methods and/or image rendering parameter selection schemes described in exemplary manner in this disclosure are contemplated.

In referring to, for example, image forming devices as this term is to be interpreted in this disclosure, such devices may include, but are not limited to, copiers, printers, scanners, facsimile machines, xerographic image forming devices, multi-function devices (MFD) including one or more of the functionalities normally associated with the above-enumerated individual image forming devices, and/or any other now known or later-developed systems or devices for producing, reproducing and/or potentially transmitting or receiving high quality monochrome and/or color images.

Figure 1:
FIG. 1 illustrates an unmodified exemplary line of white text on a dark color background.
Figure 2:
FIG. 2 illustrates an unmodified exemplary line of white text on a light color background.
Figure 3:
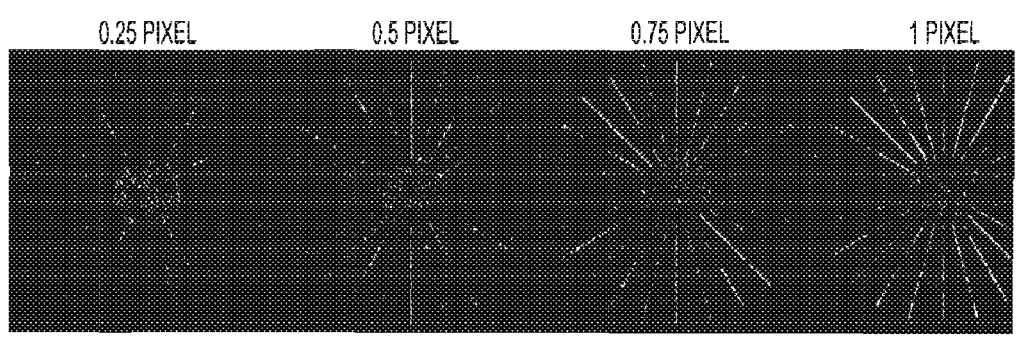
FIG. 3 illustrates an unmodified exemplary set of designs, having radiating lines with varying pixel widths.

FIGS. 1-3 are demonstrative figures showing the problem to be solved. FIG. 1 illustrates an unmodified exemplary line of white text on a dark color background. FIG. 2 illustrates an unmodified exemplary line of white on a light color background. FIG. 3 illustrates an unmodified exemplary set of designs, having radiating lines with varying pixel widths. As can be seen from these illustrative examples, as fine lines become thinner in width, and small text font characters are reduced below a certain threshold size, the visibility of individual features dramatically decreases.

Figure 4:
FIG. 4 illustrates the exemplary line of text from FIG. 1 after processing according to the methods and systems of this disclosure.
Figure 5:
FIG. 5 illustrates the exemplary line of text from FIG. 2 after processing according to the methods and systems of this disclosure.
Figure 6:
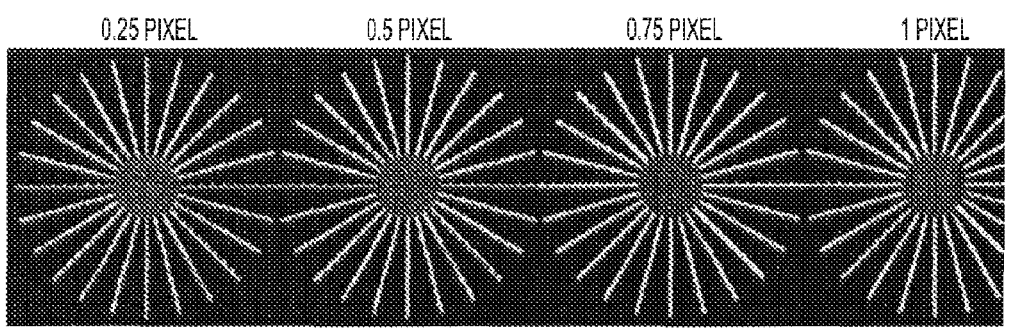
FIG. 6 illustrates the exemplary set of designs from FIG. 3 after processing according to the methods and systems of this disclosure.

FIGS. 4-6 are demonstrative figures showing examples of how, once the image quality adjustments according to this disclosure are applied, the demonstrative FIGS. 1-3 become clearer and/or more readable. FIG. 4 illustrates the exemplary line of text from FIG. 1 after processing. FIG. 5 illustrates the exemplary line of text from FIG. 2 after processing. FIG. 6 illustrates the exemplary set of designs from FIG. 3 after processing.

In order to improve the visibility and readability of small text font characters and fine lines, the characters and/or fine lines may need to be advantageously modified by a non-conventional means. In general, an object which represents text, graphics, or an image may be identified. Next, an actual or virtual frame may be put in place about the identified object. The frame may be of any shape necessary to surround the object. The frame may most advantageously include only a single object in order that processing may be undertaken to determine whether any edges of the object should be dilated. The object may be determined to have an object size (S), which can either be defined by, for example, a font size or a pixel width, as may be considered most appropriate for the composition of the object.

Two thresholds may be defined as, for example, $T_{upper}$ and $T_{lower}$. These thresholds may define a range of object size (S) such that when a size (S) of an identified object falls within this range, certain action must be taken to adjust the image quality. These thresholds may be pre-stored in a data storage unit associated with a system for implementing the method; or they may be otherwise input, such as, by user in response to an inquiry; or they alternatively otherwise may be made available to a mechanism for implementing an image adjustment determination. These thresholds may be in units of, for example, font size, or pixel width, or any other common image-related measuring unit, and should be defined in a manner to facilitate comparison to the identified object size.

Additionally, a maximum dilation amount $D_{max}$ may be defined. Dilation in this context refers to a process of widening an object by a specified amount based on an adjustment, for example, of a halftone or scan line by a number of pixels (or partial pixels). Dilation will typically occur at a transition edge between an identified object and the background. Such transition edges may be defined at, for example, color-to-white or white-to-color interfaces. The dilation amount may be based on the size of the reverse stroke for the fine line input or a small text font character size.

The object may then be dilated by the dilation amount (D) on at least one edge of the object. If the object has multiple sides, the object may be dilated by D pixels on one or both sides. This results in the object enlarging, and as such, the object potentially becoming more readable.

Dilation amounts, provided as a number of pixels, may be calculated using a series of formulas, such as:

$$\text{If } S \leq T_{lower}, D = D_{max}. \quad (1)$$

$$\text{If } S \geq T_{upper}, D = 0. \quad (2)$$

$$\text{If } T_{lower} < S < T_{upper}, D = D_{max}*(1-(S-T_{lower})/(T_{upper}-T_{lower})). \quad (3)$$

In many cases D will not be a whole number, but will have a fractional remainder. For example, when D=2.4, in order to dilate the 0.4 of a pixel in addition to two full pixels, the dilation amount may be effected by adjusting the contone the fractional pixel according to a formula;

$$\text{modified contone} = \text{original contone}*(R-D). \quad (4)$$

A value R, standing for radius, is an integer representing D rounded up. The equivalent fraction pixels are achieved by utilizing the high addressability halftone cells.

Figure 7:
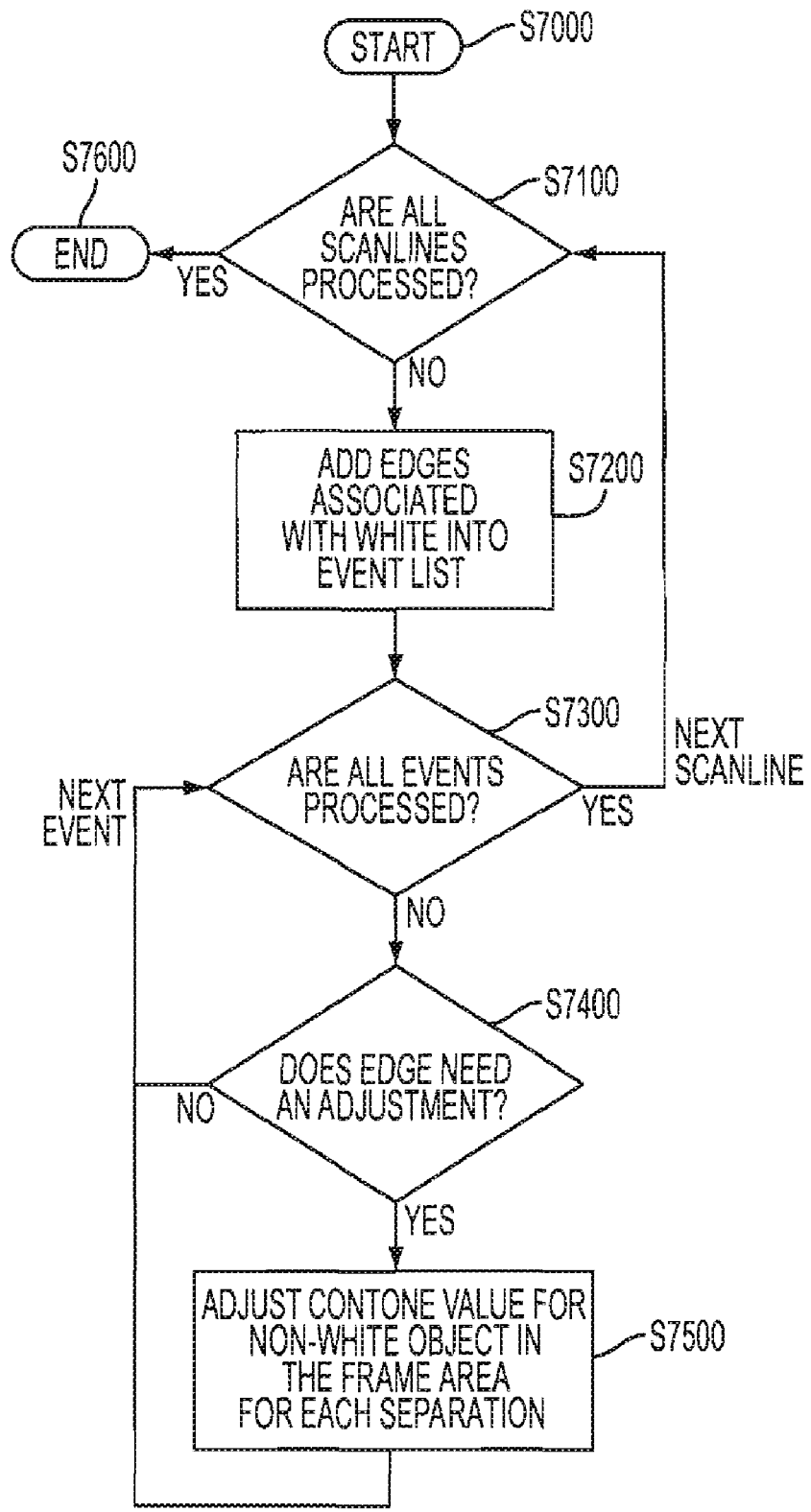
FIG. 7 illustrates a flowchart detailing a first exemplary embodiment of a method for image quality adjustment according to this disclosure.

FIG. 7 illustrates a flowchart detailing a first exemplary embodiment of a method for image quality adjustment according to this disclosure. In other words, FIG. 7 sets forth steps of a method for adjusting an edge of a fine white object. It should be appreciated that before beginning the process detailed in FIG. 7, the PDL-level objects may be decomposed into runs, which may cross several scan lines. Each run may represent a series of pixels that have the same attributes, for examples, color, object size, etc. As shown in FIG. 7, operation of the method begins at step S7000 and continues to step S7100.

Step S7100 is a determination step in which a determination is made whether an image to be printed, entered by reading individual scan lines, has had each of the scan lines processed.

If in Step S7100 a determination is made that all scan lines are processed, operation of the method continues to Step S7600 where operation of the method ceases.

If in Step S7100 a determination is made that all scan lines have not been processed, operation of the method continues to Step S7200.

In Step S7200, detected edges associated with, for example, a white-to-color transition or a color-to-white transition defined as "white" are added to an event list. Operation of the method continues to Step S7300.

Step S7300 is a determination step in which it is determined whether all events associated with edges defined in Step S7200 have been processed.

If in Step S7300 a determination is made that all current events have been processed, operation of the method reverts to Step S7100 for further processing.

If in Step S7300, a determination is made that all current events have not been processed, operation of the method continues to Step S7400.

Step S7400 is a determination step in which it is determined whether an edge, defined as an event to be processed in Step S7300, needs an adjustment.

It should be appreciated that such adjustment may be based on a determination of size of the object falling within certain pre-determined and/or on-call threshold requirements defining a range of object sizes for which edge adjustment may be undertaken.

If in Step S7400 it is determined that no edge adjustment is required, operation of the method reverts to Step S7300.

If in Step S7400, it is determined that edge adjustment is required, operation of the method proceeds to Step S7500.

In Step S7500, adjustment of an edge may be undertaken such as, for example, by dilating an edge and/or adjusting a contone value for non-white objects in a frame area for each color separation according to the exemplary equations for making such an adjustment, for example, to a dilation of the edge of the object defined above in equations (1)-(4). Operation of the method reverts to Step S7300.

It should be appreciated that when in Step 7200 a scan line is processed and a plurality of edges are identified, these edges may be added to an events list. Each scan line is processed and may consist of a plurality of white runs and non-white runs. Each edge may represent a boundary area between white runs and non-white runs. The method may judge whether a run is white, or non-white, based on a contone value of the run. Any run having a contone value below a set value may be defined as white, and any run having a contone value above the set value may be defined as non-white. Each edge may have a size (S) in pixels.

Once the event list for the scan line is propagated, an iterative loop within the process may commence. Step 7300 asks whether every edge within the scan line has been processed until every such edge is processed.

As indicated above, a decision whether an edge needs adjustment may be made by comparing its size (S) to the thresholds (step S7400). If $S \geq T_{upper}$ then the edge does not need adjustment. However, if $S < T_{upper}$ then the edge may be determined as needing adjustment. If adjustment is called for, a dilation value (D) may be calculated based on equations (1) and (3) above. Then, D number of pixels on the non-white side of the edge may have their contone values adjusted. If D is not a whole number, namely it has a decimal remainder, then a plurality of pixels representing that fractional area may have their contone values adjusted according to formula (4).

Figure 8:
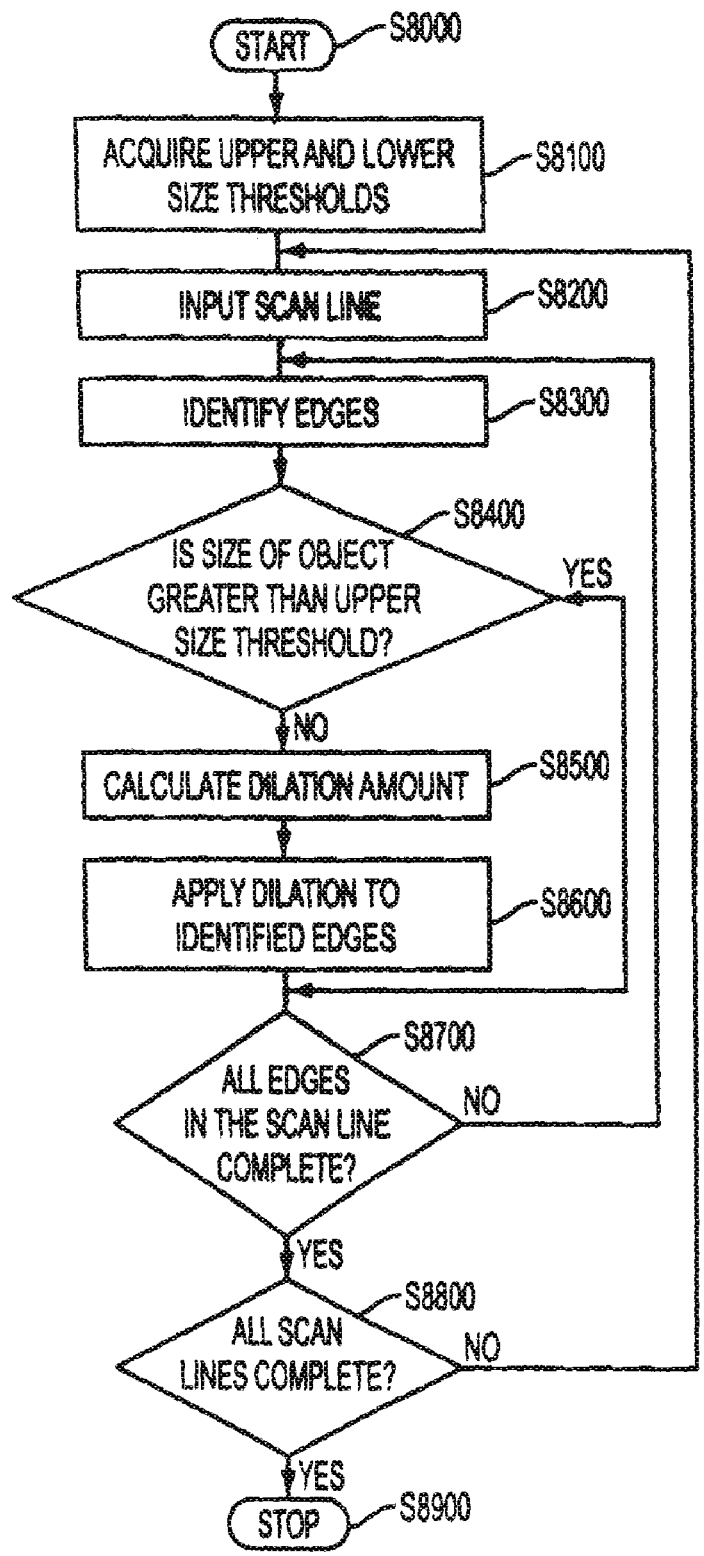
FIG. 8 illustrates a flowchart detailing a second exemplary embodiment of a method for image quality adjustment according to this disclosure.

FIG. 8 illustrates a flowchart detailing a second exemplary embodiment of a method for image quality adjustment according to this disclosure. As shown in FIG. 8, operation of the method begins at Step S8000, and proceeds to Step S8100.

In Step S8100, upper and lower size thresholds for comparison to an object size (S) may be acquired. Such acquiring of upper and lower size thresholds may be accomplished by, for example, referencing a stored database of such values that may have been predetermined, optimized and/or stored within an image forming device to be referenced for rendering when fine lines and/or small text font characters are to be reverse printed, or in any other situation where such values may prove advantageous to improving image quality. Alternatively, such thresholds may be acquired, for example, by receiving a user input in response to a user inquiry displayed on, for example, a graphical user interface associated with the image forming device. The user input may be processed by the image forming device that will process, render and/or form the output images based on input images with image quality adjusted to attempt to ensure that fine line and/or small text font characters are visible and/or readable, Operation of the method continues to Step S8200.

In Step S8200, an input image is acquired from an image source, such as, for example, an input image scanning unit. The input image may be acquired as individual scan lines. The individual scan lines may be immediately processed through the following steps of the method, or individual input scan lines may be optionally stored to be processed in sequence on a non-real time or otherwise almost-real time basis. Temporary storage of input image data may facilitate flexibility in input image processing as will be undertaken by subsequent steps in the method. Operation of the method continues to Step S8300.

In Step S8300, individual scan lines may be processed, in order that individual edges in the scan lines may be identified. One example by which such identification may be undertaken may include using a sliding window to translate, actually or virtually, along the scan line in a predetermined direction and to process data (objects) within the window. Such data inside the sliding window may include identifying any color-to-white or white-to-color interface that is detected as an edge. This identification may be made to facilitate determination within the method as to whether image adjustment, for example, by dilation of the edge, should be undertaken.

It should be appreciated that the determination step may occur contemporaneously with the identification step, or identification may produce a series of edges, which may be defined as events to be reviewed in a near-real time or other-than-real time sequence in order to determine whether image adjustment may be required and whether to apply such image adjustment as will be discussed in greater detail below. Operation of the method continues to Step S8400.

Step S8400 is a determination step in which a detected size of an object may be compared, for example, to an upper size threshold to determine whether the size of the object exceeds the upper size threshold.

If in Step S8400, a determination is made that the size of the object is greater than an upper size threshold, operation of the method proceeds to Step S8700.

If in Step S8400, a determination is made that the size of the object is not greater than an upper size threshold, operation of the method proceeds to Step S8500.

In Step S8500, an image adjustment may be determined. In exemplary manner, this image adjustment determination may be defined by calculating a dilation amount. Such dilation amount may be calculated in accordance with one or more of equations 1, 3 and 4 discussed in paragraph above. It should be appreciated that such dilation amount may be otherwise calculated in any manner which may enhance readability of the fine line and/or small text font image produced, particularly as a white reverse image on a dark and/or color background. Operation of the method continues to Step S8600.

In Step S8600, calculated dilation effects may be applied to one or more identified edges in order to advantageously affect image quality for the output images. Operation of the method continues to Step S8700.

Step S8700 is a determination step in which it may be determined whether all edges in an individual scan line that are intended to be processed, or that may have been identified for processing, have been processed.

If in Step S8700 it is determined that all edges in a scan line have not been processed, operation of the method reverts to Step S8300, or otherwise to an appropriate earlier step in the method.

If in Step S8700 it is determined that all edges in a scan line have been processed, operation of the method proceeds to Step S8800.

If in Step S8800 is a determination step in which a determination is made whether all scan lines of the scanned input image have been processed.

If in Step S8800, it is determined that all scan lines have not been processed, operation of the method reverts to Step S8200, or to otherwise to an appropriate earlier step in the method.

If in Step S8800 it is determined that all scan lines have been processed operation of the method proceeds to Step S8900, where operation of the method ceases.

It should be appreciated that the methods described in FIGS. 7 and 8 describe the processing of the image data as may be required to render fine line and/or small text font character reverse images readable when the image data is then formatted to be compatible with an output image sink. As such, each of the methods depicted in FIGS. 7 and 8 should be considered subroutines to image formation, production, and/or reproduction in any manner of image formatting device, and particularly those in which hard copy output images are properly formatted for formation, production, and/or reproduction on output image receiving media.

Figure 9:
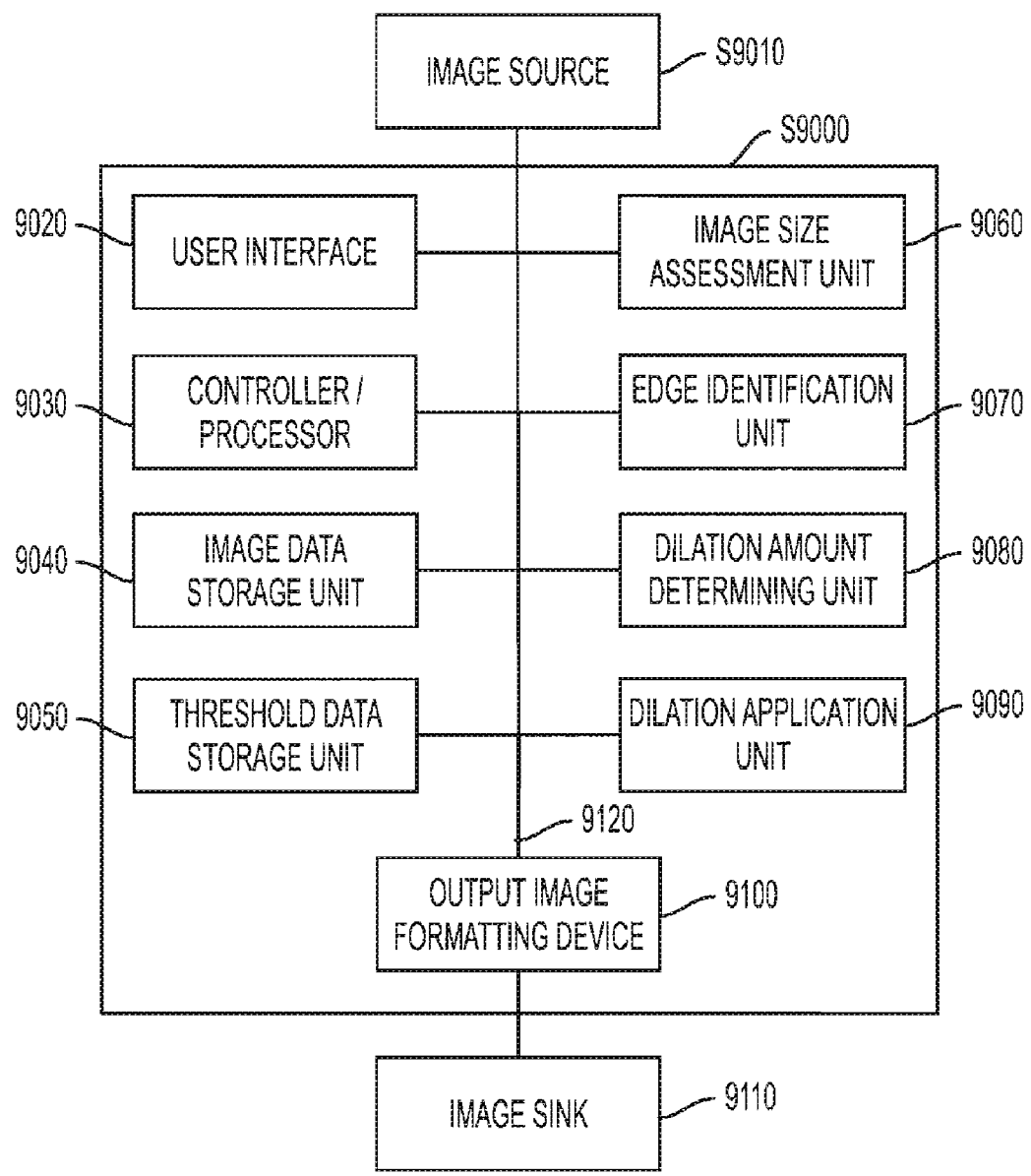
FIG. 9 illustrates a schematic block diagram of a system for implementing image quality adjustment according to this disclosure.

FIG. 9 illustrates a schematic block diagram of an exemplary system 9000 for implementing image quality adjustment according to this disclosure. As shown in FIG. 9, the image adjustment system 9000 may include, or be incorporated in, an image forming device, and/or image forming system, that may include an image source 9010, a user interface 9020, a controller/processor 9030, an image data storage unit 9040, a threshold data storage unit 9050, an image size assessment unit 9060, an edge identification unit 9070, a dilation amount determining unit 9080, a dilation application unit 9090, an output image formatting device 9100, and/or some manner of image sink 9110, all, or individually, interconnected by one or more data/control buses 9120.

In various exemplary embodiments, input images may be obtained via the image source 9010. These input images may be scanned in a line-by-line manner. Alternatively, overall input images may be decomposed in a line-by-line manner. For example, a page of a page description language (PDL) document may be decomposed and the objects within the page flattened and rasterized. As will be discussed in some detail below, a moving window may be made to translate along a raster scan line to process rasterized data within the window. Within the system 9000, processing of such scanned input image data on a real time basis may be undertaken. Alternatively, image data may be stored temporarily in, for example, an image data storage unit 9040 for later decomposition and/or processing.

The image source 9010, it should be recognized, may be any form of image receiving and/or inputting unit in, or associated with, an image forming device. The image source 9010 may include, for example, an image scanning device, an image digital data storage device, a digital still or video camera, and/or a locally or remotely located computer and/or data manipulation workstation, or any other now known or later-developed device that is capable of generating, or reproducing, electronic digital source image data, directly or as may be received, for example, from some hard copy input image data disposed on an image receiving medium. The image source 9010 may be integrated with, or connected remotely to, the image forming device. The image source 9010, if a separate device or unit from the image forming device, may be connected to the image forming device by either a direct or network data communication link, including any one or more of a wired, wireless or optical and/or like link for transmitting source image data to the exemplary system 9000. The image source 9010 itself may be capable of storing input image data.

A user interface 9020 may be provided in the form of, for example, a graphical user interface, associated with the image forming device, in order, where appropriate, to query a user, and/or receive user input, regarding variable parameters for image quality adjustment within the system 9000, and the enablement (or a switch) of the process in S9000. An example would be, if the job does not contain small reverse objects, or the reverse object image quality is not of a concern, the entire image process may be bypassed for the page in order, for example, to speed up the page processing time. A pre-process that detects small reverse objects may be implemented as an indicator for this switch. Such a capability, via some manner of user interface 9020 to receive user input may facilitate improved image production and/or reproduction, and adjustment of image quality within the system 9000. Such a user interface 9020 may afford a user an opportunity to, for example, input size thresholds $T_{lower}$ and/or $T_{upper}$, or directly input a maximum dilation amount $D_{max}$ to be used in rendering and forming particularly fine line and small text font reverse images on output image receiving media.

It should be appreciated that while the user interface 9020 may be used to receive parameters such as those described above, the user interface 9020 is not to be considered to be limited in its form or function. In other words, it should be appreciated that the user interface 9020 may also comprise, for example, an additional data storage medium and compatible digital data storage medium reading device, or a locally or remotely-located computer or other data manipulation workstation that may be in data communication with the exemplary system 9000 in order to provide user-defined parameter for operation of the system 9000, or otherwise for the image forming device within which the system 9000 may be located, or with which such a system 9000 may be associated.

A controller/processor 9030 may be provided to control overall operation of the system 9000, or otherwise to specifically control individual functions relating to adjusting image quality, to query databases stored within one or more data storage units 9040, 9050, and to carry out operations based on determinations made in other units within the system 9000, particularly those related to improving image quality regarding fine line and/or small text font reverse image formation on an output image receiving medium. The controller/processor 9030 may process image data and other monitor parameters received, for example, via one or more of the connected units in making determinations automatically within the image forming device that will support optimum image quality adjustment based on, for example, a size of a small text font character intended to be produced and/or reproduced, or the width of a fine line intended to be produced and/or reproduced.

Data storage units such as those depicted as an image data storage unit 9040 and a threshold data storage unit 9050 may be provided to store data regarding operating parameters and/or a range of parameters for use within the image forming device. Such parameters may not change over time, or may be subject to routine update as may be appropriate to improve image quality particularly with respect to production and/or reproduction of fine lines and/or small text fonts in reverse image production and/or formation. Data storage units 9040, 9050, may additionally store, for example, any manner of preset data to which the system 9000 may refer in producing and/or reproducing images on output image receiving media. As such, storage space may be available for all operating parameters of the system 9000. There may be provision for a database storing section to store one or more operating parameter databases. These databases may contain, for example, ranges of threshold data to be referenced based on a detected size of a small text font, or detected width of a fine line to be produced and/or reproduction within the image forming device. Such databases may be pre-stored containing, for example, optimally determined thresholds for a particular image forming device, and/or such databases may be routinely updateable to include certain predetermined parameters and/or threshold cross-over points to aid, via the controller/processor 9030 or separate determining unit, as will be discussed in greater detail below, in making a determination when certain automatic image quality adjustment should be applied to image data to render an optimally visible and/or readable output image.

An image size assessment unit 9060 and an edge identification unit 9070 may be included as separate units, or these functions may be combined in a single unit internal to the exemplary system 9000. In various embodiments, a sliding and/or moving window of a certain size may be applied to review each scan line of input image or input image data in order to determine a width of a particular fine line, and/or a size of a particular character of small text font character. Such determination may be made, for example, by causing movement of a window along a raster scan line in a predetermined direction to process rasterized data within the window. Inside the moving window, any color-to-white or white-to-color interface may be detected. If there is any color-to-white or white-to-color interface, the white-rasterized portion may be identified as including one or more edges at the interface between the white portion and the color portion. These interfaces may be identified specifically as edges such edges may be further identified as events in accordance with the above-described methods in order that some determination may be made whether such edges and/or events require further processing, such as, for example, adding a dilation effect to such edges and/or events. As part of the edge identification undertaken by a combined unit or a separate edge identification unit 9070, an assessment of image size may be undertaken by a combined unit or by a separate image size assessment unit 9060. Whether undertaken separately or as part of a combined unit, a size of an object within the moving window may be determined in order that a comparison may be made to one or more thresholds which may be any one of pre-determined, pre-stored, user-selected, and/or user-inputtable in the manner described above with respect to the exemplary image forming method of this disclosure.

A dilation amount determining unit 9080 may then reference information available from one or more of the image size assessment unit 9060, the edge identification unit 9070 and threshold data obtained in any one of several manners discussed above. A determination may be made whether an edge should be processed, for example, dilated, in order to enhance visibility and/or readability of a fine line based on the width of the fine line, or a character of small text font based on the size of such character as may be determined by, for example, an image size assessment unit 9060. One exemplary embodiment regarding how such determination may be made may include applying the parameters set forth in equations (1)-(4), discussed in some detail above. Such dilation may involve individual pixels, or otherwise simply portions of individual pixels in order to modify the transition between the white-to-color or color-to-white edges identified within each object by, for example, an edge identification unit 9070.

A dilation application unit 9090 may be provided specifically to apply such determined dilation amount as may be determined by a dilation amount determining unit 9080 to image data prior to the output image data being property formatted in, for example, an output image formatting device 9100 that is intended to format data appropriately to be compatible with the output image sink 9110. It should be appreciated that the function of dilation application may be incorporated into output image formatting undertaken in the output image formatting device 9100, or may occur separately in, for example, some dilation application unit 9090.

The intent of the interaction between the above-identified devices and/or units is to attempt to adjust image quality parameters within the exemplary system 9000 in order that image quality adjustment may be modified as required, or a separate methodology may be undertaken, in order to attempt to ensure that small width fine lines and/or small text font characters are visible and/or readable when formed, produced and/or reproduced on an output image receiving medium via an image sink 9110, perhaps at the expense of image sharpness.

The systems and methods according to this disclosure contemplate an image sink 9110 that is an output image receiving medium upon which a hard-copy image may be formed. Other image sinks 9110, however, to include, for example, additional display for review of an output image, and for evaluation of image quality based on, for example, image quality adjustment including edge dilation of fine lines or small text fonts to be produced and/or reproduced in the image forming device, may be employed.

It should be appreciated that although generally depicted as an integral system 9000 in FIG. 9, each of the devices and/or units (depicted as internal to, or alternatively externally connected to, the exemplary system 9000) may be either units and/or capabilities internal to an image forming device, or individually, or in combination, attached as separate units by any path that facilitates data communication (such as, for example, digital data communication of image data information, and coordination) between such units and/or devices by one or more data/control buses 9120. Such data/control buses, and/or otherwise data communication, may be undertaken by, for example, one or more of a wired, a wireless, an optical, or other like connection; either individually or via some form of network communication between the individual devices and/or components and the overall system 9000 supporting image formation in an image forming device.

Any of the data storage units depicted, or alternatively described above, may be implemented using an appropriate combination of alterable, volatile or non-volatile memory, or non-alterable, or fixed memory. The alterable memory, whether volatile or non-volatile, may be implemented using any one or more of static or dynamic RAM, or, for example, any computer-readable type media and compatible media reader, a hard drive, a flash memory, or any other like memory medium and/or device. Similarly, a non-alterable or fixed memory may be implemented using any one or more of ROM, PROM, EPROM, EEPROM, optical or other disk such as, for example, CD-ROM, DVD-ROM, blue ray or other disk type media and compatible disk drive, or any other like memory storage medium and/or device.

It should be appreciated that, given the required inputs, to include, but not be limited to, appropriate information regarding thresholds and/or dilation parameters, as generally described above, and/or inputs regarding different capability for image adjustment particularly with regard to image formation, production and/or reproduction of fine line images and/or small text font characters within an exemplary system 9000, software algorithms, hardware/firmware circuits, or any combination of software, hardware and/or firmware control elements may be used to implement the individual devices and/or units in the exemplary system 9000, or the individual units and/or devices in varying combinations as are described in general above.

The computations necessary to establish and/or to determine adjustment of individual image formation parameters such as, for example, selection from among the individual available thresholds and/or dilation parameters, may be implemented within a circuit in the image forming device itself. Alternatively, such computations may be performed on a programmable general purpose computer, special purpose computer, program microprocessor or microcontroller, or other like digital signal processing devices. These other like digital signal processor may include, but are not limited to, peripheral integrated circuit elements, ASIC, or other integrated circuits, hard-wired electronic or logic circuit, such as, for example, discrete element circuits, programmable logic devices such as PLD, PLA, FGPA or PAL or the like, or may even be manipulated through manual adjustment of one or more operating parameters and/or user-adjustable input parameters that may be associated with one or more of the operating parameters of the exemplary system 9000.

It should be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for producing an output image, comprising:
scanning an input image using an input image scanning device to produce a scanned image;
using a processor to:
identify at least one of a color-to-white or white-to-color transition in the scanned image;
determine a size of an object to be rendered as a portion of an output image based on the at least one identified transition in the scanned image;
apply an image quality adjustment to the at least one identified transition in the scanned image to modify the object as a portion of the output image based on the determined size of the object; and
using an image forming device to produce the output image including the object.

2. The method of claim 1, wherein the using a processor to identify comprises moving a sliding window across several scan lines of the scanned image.

3. The method of claim 1, wherein a white portion in the at least one of the color-to-white or white-to-color transition has a contone value below a determined threshold,
and wherein a color portion in the at least one of the color-to-white or white-to-color transition has a contone value above a determined threshold.

4. The method of claim 1, wherein the determined size of the object is defined in terms of at least one of a pixel width or font size.

5. The method of claim 1, further comprising defining an upper size threshold, above which the object will not be modified.

6. The method of claim 1, further comprising defining an lower size threshold, below which the object will be modified by a maximum amount.

7. The method of claim 1, wherein the using a processor to apply further comprises:
determining a dilation amount to be applied as an image quality adjustment to the at least one identified transition; and
applying the determined dilation amount as the image quality adjustment to the at least one identified transition.

8. The method of claim 7, wherein determining the dilation amount comprises calculating the dilation amount as a whole number of pixels D based on a size of the object, and
wherein applying the determined dilation amount comprises increasing the size of the object by the calculated D number of pixels to the at least one identified transition on at least one side of the object.

9. The method of claim 8, further comprising defining a lower size threshold, below which the object will be modified by a maximum dilation amount ($D_{max}$), wherein $D_{max} \leq (T_{upper} - T_{lower})/2$, $T_{upper}$ being the upper size threshold and $T_{lower}$ being the lower size threshold, each expressed as a number of pixels.

10. The method of claim 8, further comprising:
calculating the dilation amount D to include fractional remainder, such that the size of the object should be increased by a fraction of a pixel;
wherein applying the determined dilation amount comprises modifying a pixel by partially dilating the pixel.

11. The method of claim 10, wherein partially dilating the pixel comprises applying a modified contone value to the pixel according to the formula, modified contone value for the pixel=original contone for the pixel multiplied by (R−D), where R is an integer representing a dilation radius indicating half of the width of a sliding window.

12. A non-transitory computer-readable storage medium on which is stored a program for causing a computer to execute a method for modifying an image, the method comprising:
processing an input image along a plurality of scan lines using a sliding window;
categorizing each of a plurality of objects in each scan line as white objects and non-white objects based on a contone value, wherein any object with a contone value below a determined value is white, and any object with a contone value above the determined value non-white;
adding edges associated with white objects into an event list, each edge being an event in the event list;
determining, for each white object, an object size (S) based on a measurement between edges; and
modifying at least some runs that are adjacent to the events in the event list using a process comprising:
defining an upper size threshold ($T_{upper}$), above which the white object will not be modified;
defining a lower size threshold ($T_{lower}$), below which the white object will be modified by a maximum dilation amount ($D_{max}$);
calculating a dilation amount (D) based on a size of the white object; and
moving the edge of the white object by D number of pixels into non-white portion.

13. The computer-readable storage medium of claim 12, wherein $D_{max}$ is defined such that $D_{max} \leq (T_{upper} - T_{lower})/2$.

14. The computer-readable storage medium of claim 12, wherein if D has a fractional remainder, necessitating object being increased by a fraction of a pixel, modifying the pixel by partially dilating the pixel, such that a modified contone value in the pixel is calculated from the formula, modified contone for the pixel=original contone for the pixel multiplied by (R−D), where R is an integer representing a dilation radius indicating half of the width of the sliding window.

15. A xerographic image forming device including a system for performing the method of claim 1.

16. A non-transitory computer-readable storage medium on which is stored a program for causing a computer to execute the method of claim 1.

17. A xerographic image forming device comprising:
a processor that:
processes an input image along a plurality of scan lines using a sliding window;
categorizes each of a plurality of objects in each scan line as white objects and non-white objects based on a contone value, wherein any object with a contone value below a determined value is white, and any object with a contone value above the determined value non-white;
adds edges associated with white objects into an event list, each edge being an event in the event list;
determines, for each white object, an object size (S) based on a measurement between edges; and
modifies at least some runs that are adjacent to the events in the event list using a process comprising:
defining an upper size threshold ($T_{upper}$), above which the white object will not be modified;
defining a lower size threshold ($T_{lower}$), below which the white object will be modified by a maximum dilation amount ($D_{max}$/calculating
calculating a dilation amount (D) based on a size of the white object; and
moving the edge of the white object by D number of pixels into a non-white portion, and
an output image forming device that forms an image based upon the processed input image.

* * * * *